(12) United States Patent
Adams (10) Patent No.: US 9,787,638 B1
(45) Date of Patent: Oct. 10, 2017

(54) FILTERING DATA USING MALICIOUS REFERENCE INFORMATION

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 127 days.

(21) Appl. No.: 14/585,646

(22) Filed: Dec. 30, 2014

(51) Int. Cl.
*H04L 29/06* (2006.01)

(52) U.S. Cl.
CPC .............. *H04L 63/0236* (2013.01)

(58) Field of Classification Search
CPC .................................................. H04L 63/0236
USPC ........................................................ 726/13
See application file for complete search history.

(56) References Cited

U.S. PATENT DOCUMENTS

| | | | | |
|---|---|---|---|---|
| 6,539,396 B1* | 3/2003 | Bowman-Amuah | ............. | G06F 17/30607 707/769 |
| 2004/0210754 A1* | 10/2004 | Barron | ................ | H04L 63/0428 713/153 |
| 2004/0221062 A1* | 11/2004 | Starbuck | .............. | G06Q 10/107 709/246 |
| 2005/0114700 A1* | 5/2005 | Barrie | ................. | H04L 63/0236 726/4 |
| 2005/0188423 A1* | 8/2005 | Motsinger | ........... | H04L 63/0876 726/22 |
| 2013/0070745 A1* | 3/2013 | Nixon | ..................... | H04L 45/74 370/338 |
| 2013/0246377 A1* | 9/2013 | Gaitonde | ............ | H04L 63/0236 707/697 |
| 2015/0372980 A1* | 12/2015 | Eyada | ................. | H04L 63/1416 726/1 |

OTHER PUBLICATIONS

University of Arkansas, "Email Filters," https://techarticles.uark.edu/email/email_filters/, Sep. 22, 2014, 2 pages.
Proofpoint, "Email Phishing Protection and Management Filter," http://www.proofpoint.com/products/protection/phishing-protection-and-management.php, Nov. 2, 2011, 2 pages.
Bianco, "EZ Snort Rules: Find the Truffles, Leave the Dirt," Vorant Network Security, Inc., www.vorant.com/files/EZ_Snort_Rules.pdf, Apr. 8, 2006, 21 pages.

(Continued)

*Primary Examiner* — Amir Mehrmanesh
*Assistant Examiner* — Sakinah Taylor
(74) *Attorney, Agent, or Firm* — Harrity & Harrity, LLP (57) ABSTRACT

A device may receive data from a first endpoint device. The device may identify a network protocol. The network protocol may be associated with receiving the data. The device may identify a format. The format may be associated with encoding textual information in the data. The device may determine, based on the format and the network protocol, text in the data. The device may determine whether the text includes a reference from a plurality of references. The plurality of references may identify addresses associated with malicious devices. The device may selectively forward the data to a second endpoint device based on determining whether the text includes the reference.

20 Claims, 9 Drawing Sheets

(56) References Cited

OTHER PUBLICATIONS

Schwartzman, "Raspberries! Botnet Spam Just Got a Whole Lot More Dangerous," http://www.circleid.com/posts/20121201raspberries_botnet_spam_just_got_a_whole_lot_more_dangerous/, Dec. 1, 2012, 3 pages.

The Spamhaus Project, "Frequently Asked Questions," http://www.spamhaus.org/faq/section/Spamhaus%20DBL, Mar. 2, 2010, 6 pages.

Chestnut, "URL Shorteners and Blacklists," Mailchimp, http://blog.mailchimp.com/url-shorteners-and-blacklists/, Aug. 19, 2009, 4 pages.

\* cited by examiner

FILTERING DATA USING MALICIOUS REFERENCE INFORMATION

BACKGROUND

A network device may receive data packets from a sending device, may identify a recipient device, and may forward the data packets to the recipient device. The data packets may represent one or more discrete data objects. For example, a particular set of data packets may represent a web page, a software application, or some other data object. A data object may include textual information which may be identified based on a data format associated with the data object.

SUMMARY

According to some possible implementations, a device may include one or more processors to: receive data from an endpoint device; identify a network protocol, the network protocol being associated with receiving the data; identify a format, the format being associated with encoding textual information in the data; determine, based on the format and the network protocol, text in the data; determine whether the text includes a reference from a plurality of references, the plurality of references identifying addresses associated with malicious devices; and selectively forward the data to a second endpoint device based on determining whether the text includes the reference.

According to some possible implementations, a computer-readable medium may store instructions that, when executed by one or more processors, cause the one or more processors to: receive, from a first device, a list of references, the list of references identifying a set of devices, the set of devices being associated with malicious network activity; receive, from a second device, a set of packets, the set of packets representing a file sent according to a network protocol, representing the file being encoded according to a file format, and identifying a third device as a recipient for the file; identify a network profile from a plurality of network profiles, the network profile corresponding to the network protocol; assemble the file from the set of packets based on the network profile; identify a format profile from a plurality of format profiles, the format profile corresponding to the file format; determine, based on the format profile, whether the file includes a reference from the list of references; send the set of packets to the third device based on determining that the file does not include the reference; and drop the set of packets based on determining that the file includes the reference.

According to some possible implementations, a method may include: receiving, by a device, data from a sending device; determining, by the device, whether the data includes encoded text; identifying, by the device and based on determining whether the data includes encoded text, text from the data; normalizing, by the device, the text to generate a normalized text, the normalized text being encoded according to a text format; determining, by the device, whether the normalized text identifies a device included in a list of devices; and selectively forwarding, by the device, the data to a receiving device based on determining whether the normalized text identifies a device in the list of devices.

DETAILED DESCRIPTION

The following detailed description of example implementations refers to the accompanying drawings. The same reference numbers in different drawings may identify the same or similar elements.

A network operator may implement a network device, such as a network device associated with a network intrusion detection system, to detect and prevent network connections to malicious hosts. For example, a network intrusion detection system may intercept a packet, may determine whether a sender or an intended recipient of the packet is a malicious host, and may selectively forward the packet based on determining whether the sender or the intended recipient of the packet is a malicious host. The network intrusion detection system may thus limit damage to endpoint devices, caused by malicious hosts. However, an attempted connection to a malicious host, by an endpoint device associated with the network intrusion detection system, may indicate that the endpoint device has already been compromised by a malicious object (e.g., malware, spyware, ransomware, a virus, a Trojan horse, or the like). Thus, by preventing network connections to malicious hosts, the network intrusion detection system may not adequately protect an endpoint device from being compromised.

However, by detecting a reference to a malicious host within the content of a packet and/or a set of packets, the network operator may prevent an endpoint device from becoming compromised (e.g., by a malicious object). For example, a network intrusion prevention system may intercept a packet and/or a set of packets, may determine whether the packet and/or set of packets contains a reference to a malicious host, and may selectively forward the packet and/or set of packets based on determining whether the packet and/or set of packets contains a reference to a malicious host. In this way, the network intrusion prevention system may drop packets associated with a malicious object to prevent an endpoint device from being compromised by the malicious object.

Figure 1:
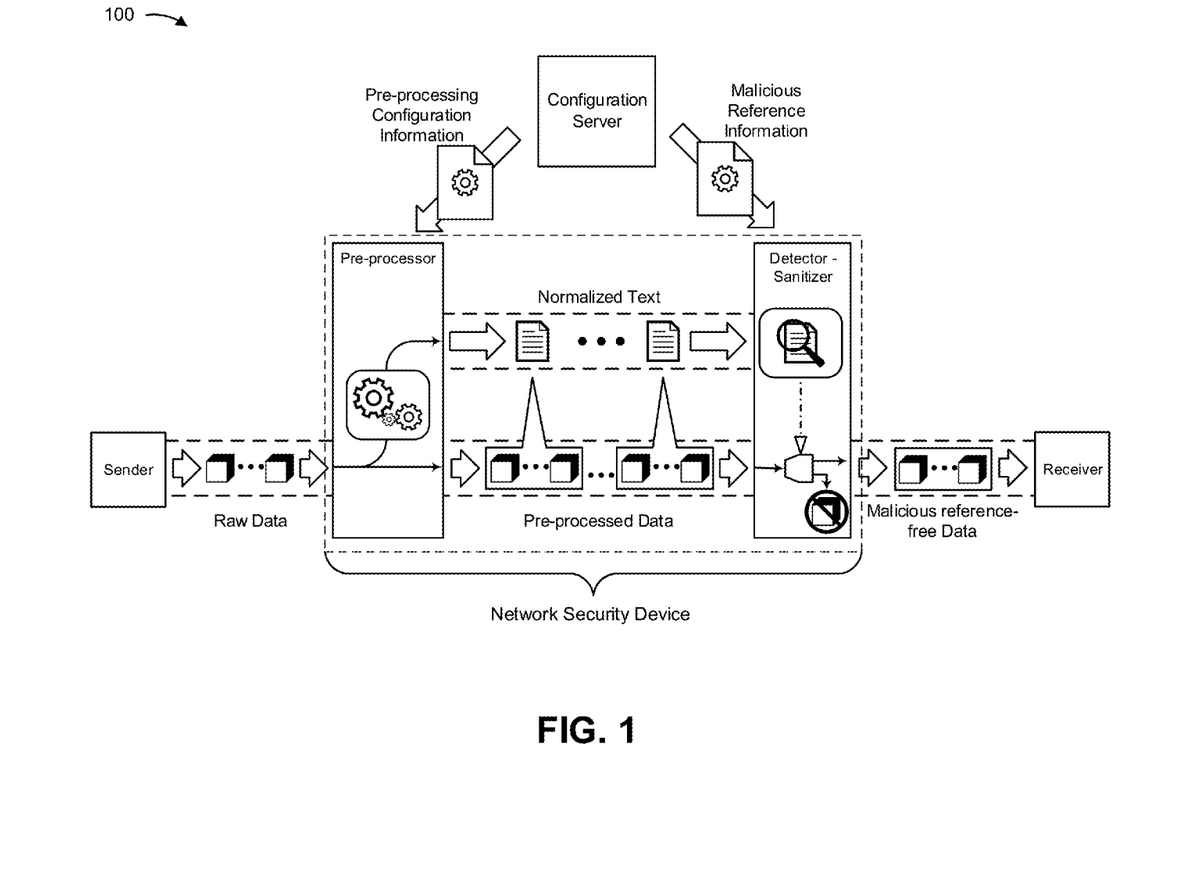
FIG. 1 is a diagram of an overview of an example implementation described herein.

FIG. 1 is a diagram of an overview of an example implementation 100 described herein. As shown in FIG. 1, a network security device may receive raw data, as data packets, from a sender. The network security device may pre-process the data packets, based on a pre-processing configuration received from a configuration server, to separate the data packets into sets of data packets and to generate sets of normalized text corresponding to the sets of packets. The network security device may receive malicious reference information, identifying a set of malicious references (e.g., references to malicious hosts), from the configuration server and may detect whether the sets of normalized text contain a malicious reference identified in the malicious reference information. If the network security device detects a malicious reference in the normalized text, the network security device may drop a set of packets associated with the normalized text. If the network security device does not detect a malicious reference in the normalized text, the network security device may forward the set of packets, associated with the normalized text, to a receiver. In this way, the network security device may forward, to the receiver, only data which does not contain a malicious reference and, thus, may prevent the receiver from being compromised by invoking the reference.

Figure 2:
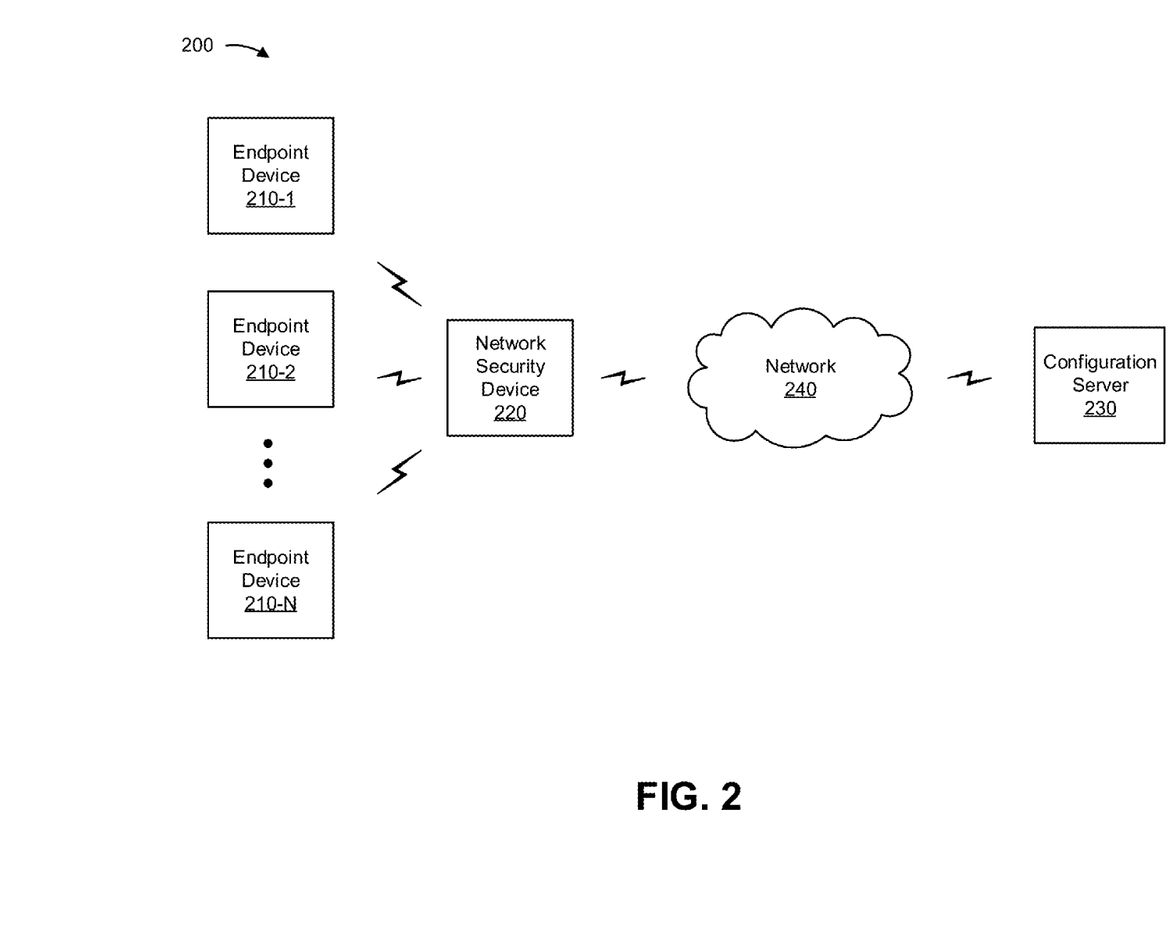
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of endpoint devices 210-1 to 210-N (referred to individually as "endpoint device 210" and collectively as "endpoint devices 210"); a network security device 220; a configuration server 230; and/or a network 240. Devices of environment 200 may interconnect via wired connections, wireless connections, or a combination of wired and wireless connections.

Endpoint device 210 may include one or more devices capable of receiving and/or providing information over a network (e.g., network 240), and/or capable of generating, storing, and/or processing information received and/or provided over the network. For example, endpoint device 210 may include a computing device, such as a laptop computer, a tablet computer, a handheld computer, a desktop computer, a server device, a mobile phone (e.g., a smart phone, a radiotelephone, etc.), or a similar device. Endpoint device 210 may act as an endpoint (e.g., a source and/or a destination) for a communication with another endpoint device 210. For example, a first endpoint device 210 may provide information to a second endpoint device 210 (e.g., via network security device 220 and/or network 240).

Network security device 220 may include one or more devices (e.g., one or more traffic transfer devices) capable of processing and/or transferring traffic between endpoint devices 210. For example, network security device 220 may include a firewall, a router, a gateway, a switch, a hub, a bridge, a reverse proxy, a server (e.g., a proxy server), a security device, an intrusion detection device, an intrusion prevention device, a load balancer, or a similar device. In some implementations, network security device 220 may be positioned as a gateway between a first network 240 (e.g., a private network), including one or more endpoint devices 210, and a second network 240 (e.g., a public network) which may include other endpoint devices 210 and/or other network security devices 220. Alternatively, or additionally, network security device 220 may be positioned as a proxy for endpoint devices 210.

Configuration server 230 may include one or more devices capable of storing, processing, and/or providing information. For example, configuration server 230 may include a server device or a collection of server devices (e.g., affiliated or unaffiliated server devices). In some implementations, configuration server 230 may store pre-processing configuration information and/or reference information. Configuration server 230 may provide the pre-processing configuration information and/or the reference information to network security device 220 and/or another device.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
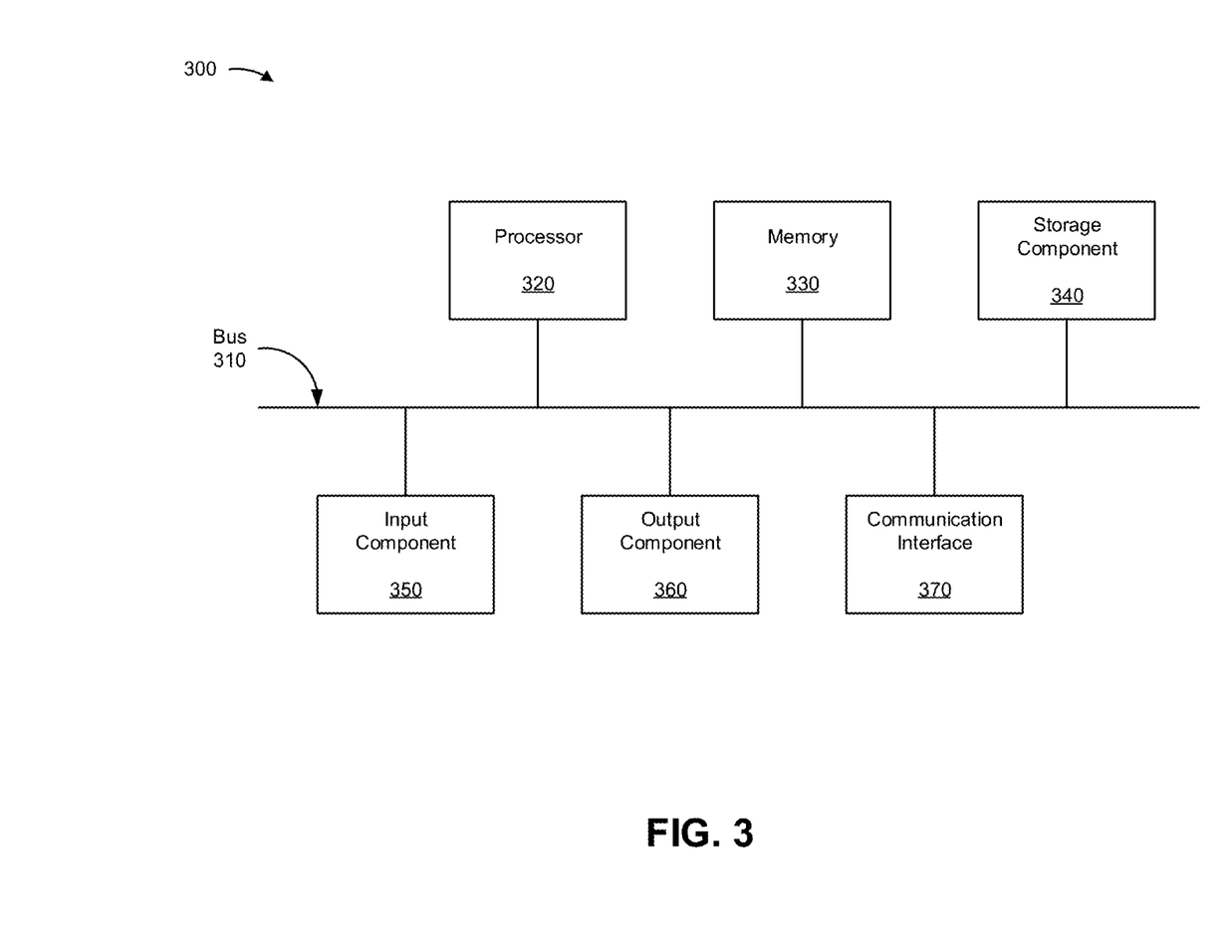
FIG. 3 is a diagram of example components of one or more devices of FIG. 2.

FIG. 3 is a diagram of example components of a device 300. Device 300 may correspond to endpoint device 210, network security device 220, and/or configuration server 230. In some implementations, endpoint device 210, network security device 220 and/or configuration server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented with hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
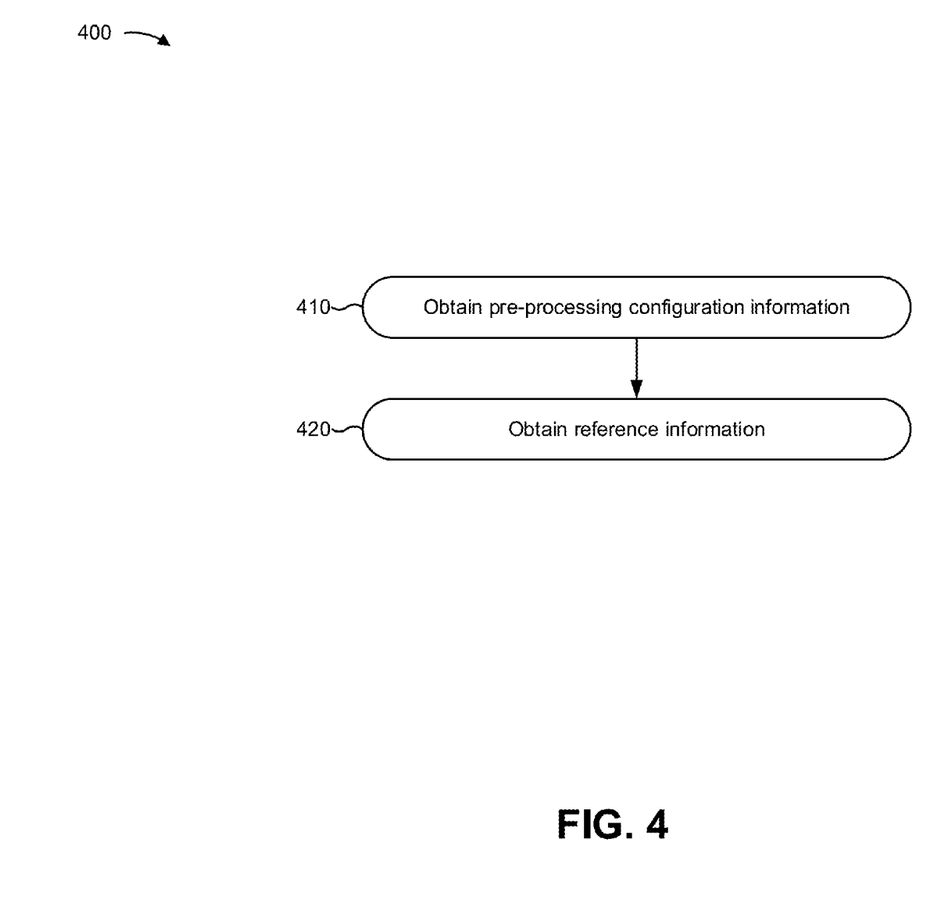
FIG. 4 is a flow chart of an example process for configuring a network device to filter data using reference information.

FIG. 4 is a flow chart of an example process 400 for configuring a network device to filter data using reference information. In some implementations, one or more process blocks of FIG. 4 may be performed by network security device 220. In some implementations, one or more process blocks of FIG. 4 may be performed by another device or a set of devices separate from or including network security device 220, such as endpoint device 210 and/or configuration server 230.

As shown in FIG. 4, process 400 may include obtaining pre-processing configuration information (block 410). For example, network security device 220 may obtain pre-processing configuration information associated with determining normalized text based on data. In some implementations, network security device 220 may obtain pre-processing configuration information by "pulling" (i.e., retrieving) the pre-processing configuration information from another device (e.g., from configuration server 230). Alternatively, or additionally, network security device 220 may obtain pre-processing configuration information from another device (e.g., from configuration server 230) without sending a corresponding request (e.g., based on configuration server 230 "pushing" the pre-processing configuration information to network security device 220). Alternatively, or additionally, network security device 220 may obtain pre-processing configuration information incrementally, e.g., as an update to existing pre-processing configuration information maintained in memory and/or storage associated with network security device 220.

In some implementations, the pre-processing configuration information may include network protocol information associated with pre-processing data based on one or more network protocols associated with receiving the data. The network protocol information may describe a process for assembling a set of packets into a single data object based on a network protocol associated with receiving the set of packets. For example, a particular network protocol may be associated with transmitting a data object as fragments which satisfy a packet size threshold (e.g., a maximum transmission unit (MTU)) and/or may transmit a data object as a stream of segments (e.g., based on the transmission control protocol (TCP)). Alternatively, or additionally, the network protocol information may be associated with identifying a portion of the data associated with detecting a malicious reference (e.g., a payload portion and/or a header portion). In some implementations, the network protocol information may be represented as a set of network profiles corresponding to a set of network protocols. The pre-processing information may enable network security device 220 to defragment and/or de-segment the packets to reassemble the data object from the packets (e.g., into a data and/or program file).

In some implementations, the pre-processing configuration information may include file format information associated with pre-processing data based on a format associated with the data. The file format information may describe a process for identifying text from a data object and/or a packet associated with the data object based on a file format associated with the data object. For example, the file format information may include information for determining and/or parsing a structure associated with the packet and/or data object. For example, the file format information may include information associated with metadata (e.g., a header, a file extension, a multi-purpose internet mail extension (MIME)), a reference structure, or the like.

Alternatively, or additionally, the file format information may include information for identifying an encoding format associated with text contained in the data object and/or information for decoding the data object to determine the text contained therein. An encoding format may include a text encoding format, such as character set, a character map, a character repertoire, a coded character set (CCS), a character encoding form (CEF), a character encoding scheme (CES), or the like (e.g., associated with the American Standard Code for Information Interchange (ASCII), a Universal Character Set Transformation Format (e.g., UTF-8, UTF-16, or the like), an International Organization for Standardization (ISO) format (e.g., ISO 8859-1), or the like).

Alternatively, or additionally, an encoding format may include a binary encoding format, e.g., associated with an encryption/decryption format, a compression/decompression format, a file container format, or the like. For example, the file format information may include information for determining text from data based on performing a decryption process on encrypted data, a decompression process on compressed data, an unpacking process on data within a file container, or the like. Alternatively, or additionally, the file format information may include information for converting binary information into text (e.g., by performing a character recognition process on an image represented by the binary information).

In some implementations, the pre-processing configuration information may include text extraction information for identifying a particular portion of a packet and/or data object from which to identify text. For example, the text extraction information may be associated with a particular context, domain, or the like. Alternatively, or additionally, the text extraction information may identify pre-processing references associated with identifying portions of text to be determined. For example, the text extraction information may identify one or more hypertext markup language (HTML) tags (e.g., <a>, <script>, or the like) to identify portions of data, associated with a webpage, to which a malicious reference (e.g., a malicious hyperlink) may be matched. In some implementations, the pre-processing configuration information may include text normalization information associated with transforming text identified from data into a single canonical form (e.g., into normalized text). For example, the text normalization information may include information associated with encoding identified text (e.g., to match a particular text encoding format of a malicious reference. Alternatively, or additionally, the text extraction information may include information associated with text to be excluded. For example, the text extraction information may identify "noise" to be excluded (e.g., words and/or n-grams associated with text which is not to be matched to a malicious reference).

By obtaining the pre-processing configuration information, network security device 220 may identify one or more processes for generating normalized text, based on data, that can be used to selectively forward the data based on detecting whether the normalized text contains a malicious reference.

As further shown in FIG. 4, process 400 may include obtaining reference information (block 420). For example, network security device 220 may obtain reference information identifying one or more malicious references to be detected. In some implementations, network security device 220 may obtain reference information by "pulling" (i.e., retrieving) the reference information from another device (e.g., from configuration server 230). Alternatively, or additionally, network security device 220 may obtain reference information from another device (e.g., from configuration server 230) without sending a corresponding request (e.g., based on configuration server 230 "pushing" the reference information to network security device 220). Alternatively, or additionally, network security device 220 may obtain reference information incrementally (e.g., as an update to existing reference information maintained in memory and/or storage associated with network security device 220).

In some implementations, a malicious reference may be associated with identifying a particular malicious device and/or set of devices. For example, the reference information may include an address, such as a hostname, a domain name, an internet protocol (IP) address, a uniform resource locator (URL), or the like. A malicious device may include a device operating as a server, a node, a proxy, a relay, or the like, e.g., associated with compromising and/or harming endpoint device 210 and/or network security device 220. For example, a malicious device may be associated with operating as a command and control network (e.g., a "botnet" device associated with remotely controlling a compromised "bot" device), initiating a "drive-by download," or the like.

In some implementations, a malicious reference may be represented as a string of characters. For example, a malicious reference may include a letter, a number, a punctuation mark, or the like. The string of characters may be encoded in a particular text encoding format (e.g., corresponding to an encoding format associated with generating normalized text according to the pre-processing configuration information). Alternatively, or additionally, a malicious reference may be represented as a regular expression. For example, the malicious reference may include a literal, a meta-character, an escape sequence, or the like.

By obtaining the reference information, network security device 220 may identify one or more malicious references within received data to permit network security device 220 to selectively forward the data based on detecting whether text, associated with the data, contains a malicious reference. In this way, network security device 220 may avoid forwarding data which may contain and/or be associated with a malicious object.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
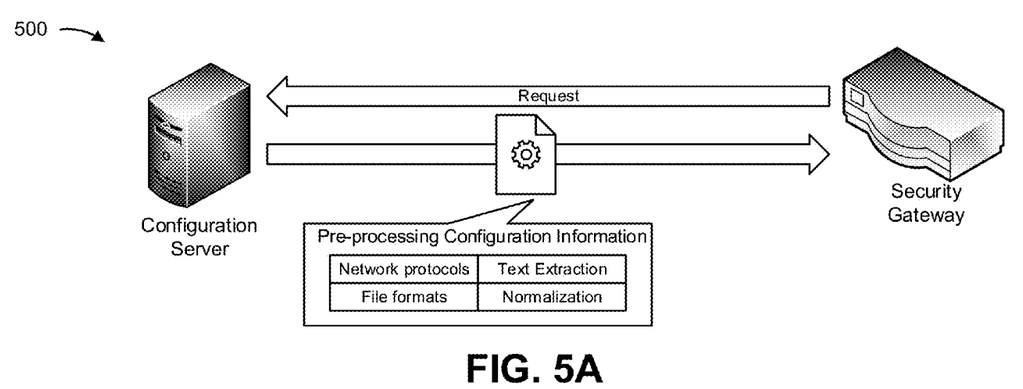
FIGS. 5A-5B are diagrams of an example implementation relating to the example process shown in FIG. 4.
Figure 5B:
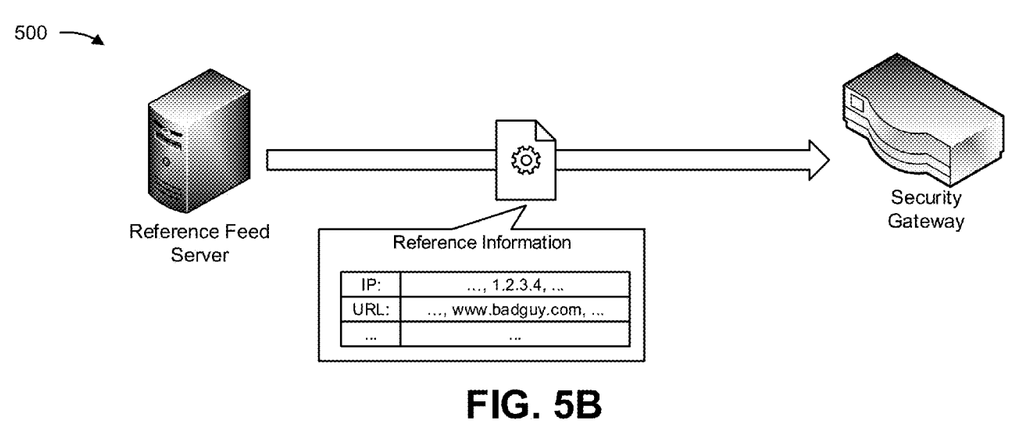

FIGS. 5A-5B are diagrams of an example implementation 500 relating to example process 400 shown in FIG. 4. FIGS. 5A-5B show an example of configuring a network device to filter data using reference information.

As shown in FIG. 5A, assume, for example implementation 500, that a security gateway (e.g., a network security device 220) requests and receives, from a configuration server (e.g., configuration server 230), pre-processing configuration information. Assume further that the pre-processing configuration information includes information associated with network protocols, file formats, text extraction, and/or normalization. In this way, the security gateway may receive pre-processing configuration information for generating normalized text based on data received by the security gateway.

As shown in FIG. 5B, assume, for example implementation 500, that a reference feed server (e.g., configuration server 230) sends (e.g., "pushes") reference information, identifying malicious references associated with one or more botnets (shown as "Reference Information"), to the security gateway. Assume further that the reference information identifies a malicious reference associated with a particular IP address (here, "1.2.3.4") and another malicious reference associated with a particular URL (here, "www.badguy.com"). In this way, the security gateway may be configured to identify malicious references within the normalized text.

As indicated above, FIGS. 5A-5B are provided merely as an example. Other examples are possible and may differ from what was described with regard to FIGS. 5A-5B.

Figure 6:
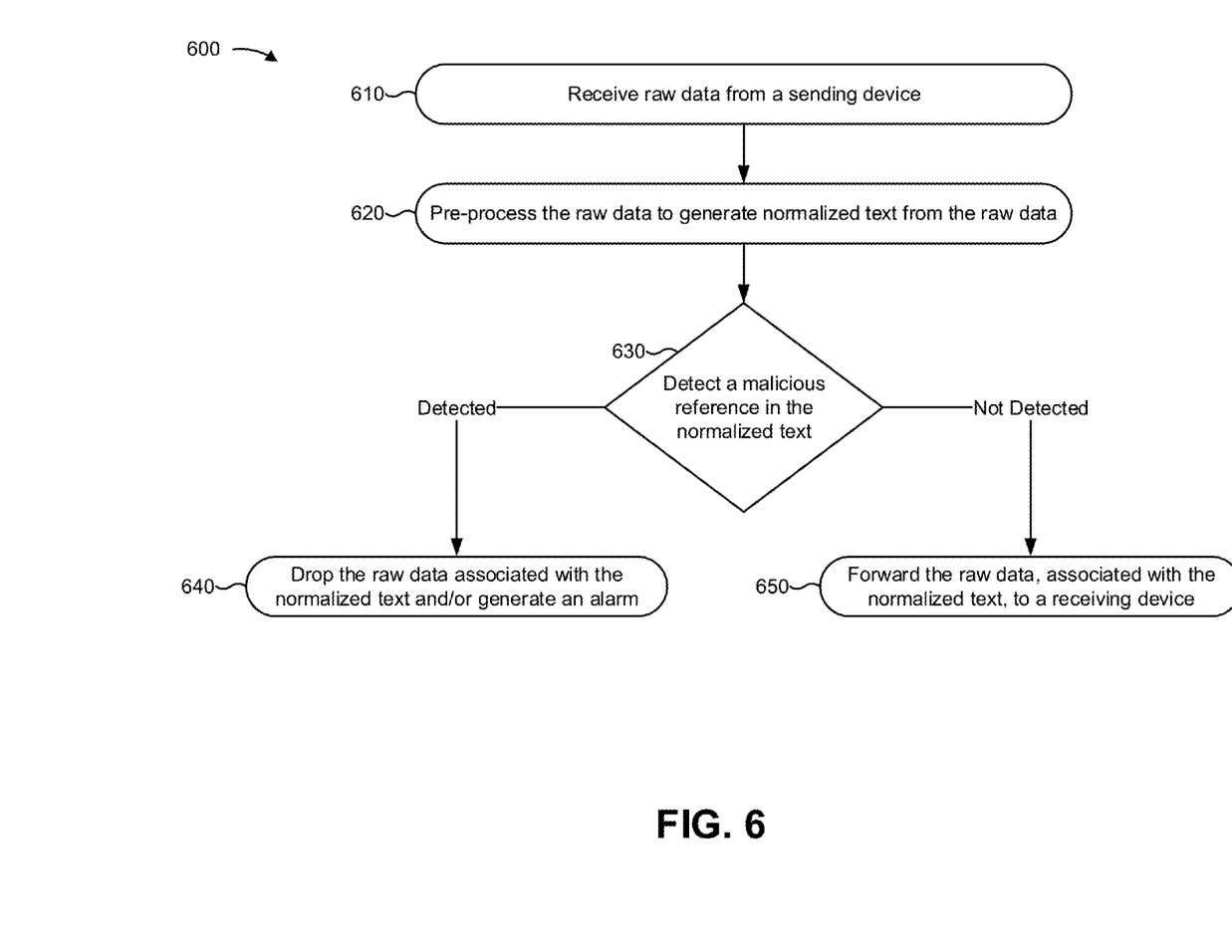
FIG. 6 is a flow chart of an example process for filtering data using reference information.

FIG. 6 is a flow chart of an example process 600 for filtering data using reference information. In some implementations, one or more process blocks of FIG. 6 may be performed by network security device 220. In some implementations, one or more process blocks of FIG. 6 may be performed by another device or a set of devices separate from or including network security device 220, such as endpoint device 210 and/or configuration server 230.

As shown in FIG. 6, process 600 may include receiving raw data from a sending device (block 610). For example, network security device 220 may receive raw data from endpoint device 210 and/or a device associated with network 240. The raw data may include one or more packets, such as one or more packets associated with an executable file, a document, a webpage, or the like. Network security device 220 may buffer the raw data to perform further analysis. In some implementations, network security device 220 may receive the raw data based on determining that a sender (e.g., a sending endpoint device 210) and/or a receiver (e.g., a receiving endpoint device 210) of the raw data is not identified as being a malicious device (e.g., based on reference information). In this way, network security device 220 may obtain data from which text may be identified to detect a malicious reference.

As further shown in FIG. 6, process 600 may include pre-processing the raw data to generate normalized text from the raw data (block 620). For example, network security device 220 may combine packets, associated with the raw data, based on pre-processing configuration information, to defragment and/or de-segment a data object included in the raw data. In some implementations, network security device 220 may identify a file format (e.g., an encoded file, a compressed file, an encrypted file, or the like), associated with the raw data, based on the pre-processing configuration information. In that case, network security device 220 may transform the raw data (e.g., by decoding, decrypting, decompressing, or the like) based on the file format. In this way, network security device 220 may be configured to process a larger variety of file formats.

Alternatively, or additionally, network security device 220 may identify and/or normalize text from the raw data based on the pre-processing configuration information. For example, assume that the raw data describes a word processor document file. Assume further that a text string included in the word processor document file may be obfuscated when the word processor document file is converted to raw data (e.g., that additional, different characters related to formatting or the like are included with the text string, thus obfuscating the text string). Assume that network security device 220 identifies the file format of the word processor document file based on the pre-processing configuration information. Network security device 220 may normalize the text string from the raw data based on the pre-processing configuration information (e.g., network security device 220 may remove the additional, different characters related to formatting or the like, thus determining the text string as included in the word processor document file). In this way, network security device 220 may be configured to identify text in a large variety of raw data types.

As further shown in FIG. 6, process 600 may include detecting a malicious reference in the normalized text (block 630). For example, network security device 220 may detect a malicious reference in the normalized text by determining whether the normalized text includes one or more malicious references identified by the reference information (e.g., a malicious reference feed). In some implementations, network security device 220 may detect a malicious reference in the normalized text by parsing the normalized text.

In some implementations, network security device 220 may detect a malicious reference in the normalized text by comparing the normalized text to the reference information. For example, assume that the reference information defines www.example.com as a malicious reference, and is associated with reference text that includes a text string of "www.example.com". Assume further that the normalized text also includes the text string of "www.example.com". Network security device 220 may compare the normalized text to the reference information, and may determine that the text string in the normalized text matches the text string in the reference text. Based on the matching text strings, network security device 220 may determine that a malicious reference is included in the normalized text.

As further shown in FIG. 6, process 600 may include dropping the raw data associated with the normalized text and/or generating an alarm (block 640) based on detecting a malicious reference in the normalized text (block 630="Detected"). For example, network security device 220 may drop a packet and/or set of packets corresponding to normalized text containing a malicious reference. Dropping the raw data may include blocking the raw data and/or otherwise preventing the raw data from being transmitted toward a destination associated with the raw data (e.g., another endpoint device 210 and/or a device associated with network 240). In this way, network security device 220 may drop raw data associated with normalized text containing a malicious reference.

Alternatively, or additionally, network security device 220 may generate an alarm. For example, network security device 220 may send a message, identifying the raw data, the normalized text, and/or the detected malicious reference(s), to another device (e.g., to an endpoint device 210 and/or a device associated with network 240). In this way, network security device 220 may alert a user (e.g., a sender and/or recipient) and/or a network operator (e.g., associated with network security device 220 and/or network 240) of raw data associated with normalized text containing a malicious reference.

In some implementations, network security device 220 may prevent a device (e.g., an endpoint device 210 and/or a device of network 240), associated with sending and/or receiving the raw data, from accessing one or more resources and/or from communicating with one or more devices of environment 200. For example, network security device 220 may identify a particular device as having sent and/or requested the raw data which contains a malicious reference, and network security device 220 may prevent the particular device from communicating with other devices. In this way, network security device 220 may prevent the particular device from sending and/or requesting other potentially malicious data.

By blocking data containing malicious references and/or generating an alarm when such data is detected, network security device 220 may prevent endpoint devices 210 from becoming compromised by the data containing malicious references.

As further shown in FIG. 6, process 600 may include forwarding the raw data, associated with the normalized text, to a receiving device (block 650) based on not detecting a malicious reference in the normalized text (block 630="Not Detected"). For example, network security device 220 may forward the raw data by transmitting the raw data toward a destination associated with the raw data (e.g., an endpoint device 210 and/or a device of network 240). In this way, network security device 220 may allow endpoint devices 210 to send and/or receive data which does not contain a malicious reference.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of example implementations 700-720 relating to example process 600 shown in FIG. 6. FIGS. 7A-7F show examples of filtering data using reference information.

Figure 7A:
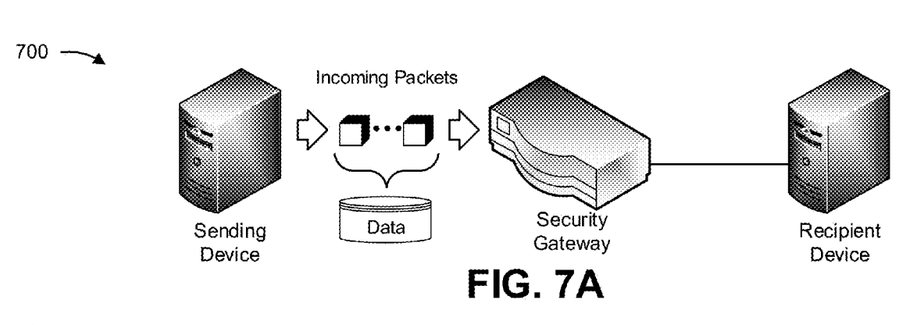
FIGS. 7A-7F are diagrams of example implementations relating to the example process shown in FIG. 6.
Figure 7B:
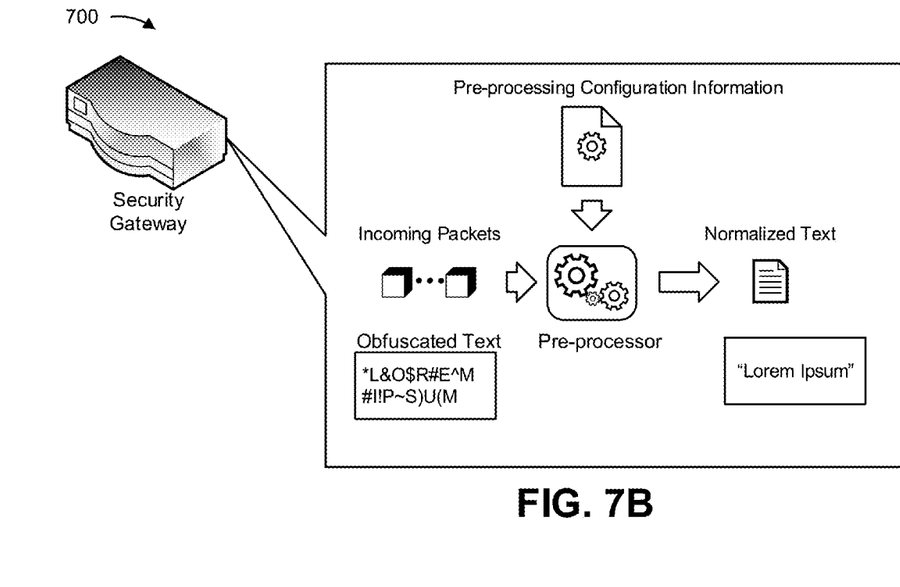

As shown in FIG. 7A, assume, for example implementation 700, that a security gateway (e.g., a network security device 220) has been configured according to example implementation 500 (FIGS. 5A and 5B). Assume further that the security gateway receives data, as a set of incoming packets, from a sending device (e.g., an endpoint device 210 and/or a device of network 240). Assume that the data describes a word processor document file, in which text is obfuscated as a result of transmitting the word processor document file as raw data (here, the obfuscated text is shown in FIG. 7B as "*L&O$R#E^M #I!P~S)U(M"). Assume further that the data is destined for a recipient device (e.g., an endpoint device 210 and/or a device of network 240) connected to the security gateway.

As shown in FIG. 7B, assume, for example implementation 700, that the security gateway provides the incoming packets as input to a pre-processor component of the security gateway. Assume further that the pre-processor is configured to normalize text in a word processor document file, by de-obfuscating the text, based on the pre-processing configuration information. Assume further that the security gateway generates a normalized text, by de-obfuscating the text in the word processor document file, based on pre-processing the incoming packets. Here, the normalized text is shown as "Lorem ipsum".

Figure 7C:
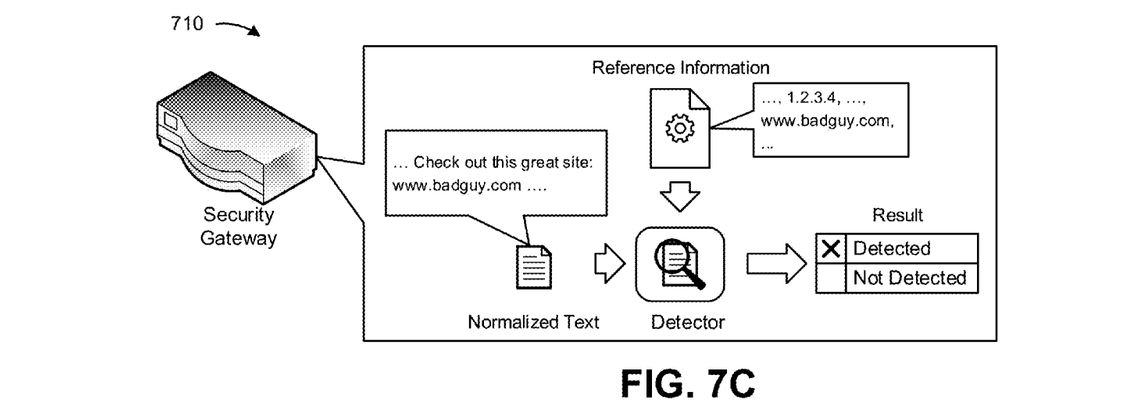

As shown in FIG. 7C, assume, for example implementation 710, that the security gateway provides the normalized text as input to a detector component of the security gateway to determine whether the normalized text includes a malicious reference identified by the reference information. Assume that the detector component of the security gateway compares the normalized text to the reference information, and detects a text string in the normalized text (here, "Check out this great site: www.badguy.com") that matches a malicious reference identified by the reference information (here, www.badguy.com). Assume further that, based on determining that the normalized text includes a text string that matches a malicious reference identified by the reference information, the detector indicates that a malicious reference has been detected.

Figure 7D:
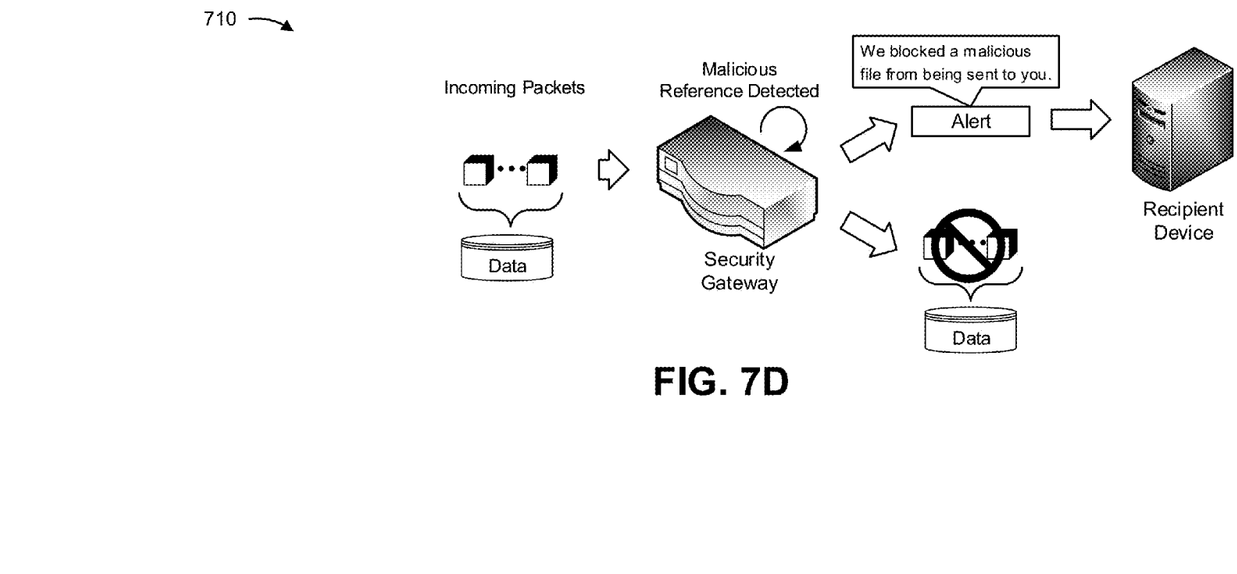

As shown in FIG. 7D, assume, for example implementation 710, that, based on detecting a malicious reference in the normalized text, the security gateway drops (e.g., deletes without forwarding) the incoming packets. Assume further that the security gateway sends, to the recipient device, an alert (e.g., "We blocked a malicious file from being sent to you.") based on dropping the incoming packets. In this way, the security gateway may prevent the recipient device from receiving data associated with a malicious device by dropping data which contains a reference to the malicious device.

Figure 7E:
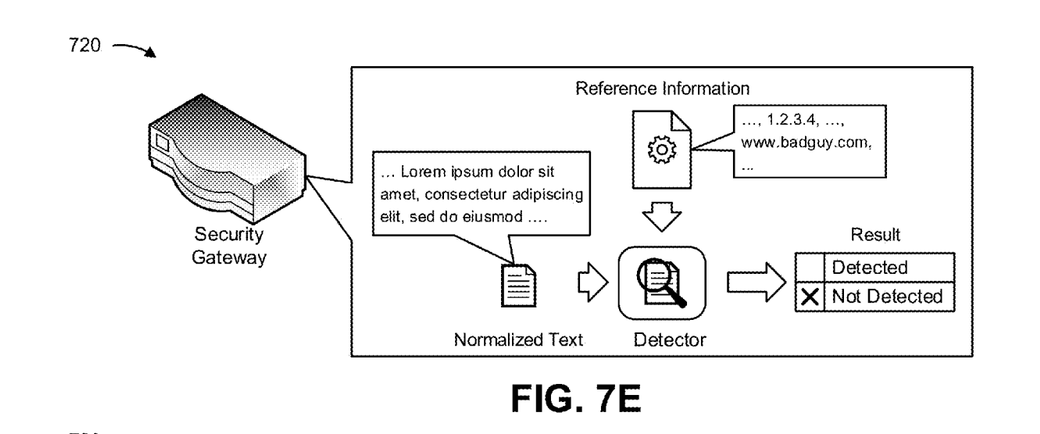

As shown in FIG. 7E, assume, for example implementation 720, that the security gateway provides the normalized text as input to a detector component of the security gateway to determine whether the normalized text includes a malicious reference identified by the reference information. Assume that the detector component of the security gateway compares the normalized text to the reference information, and does not detect a text string in the normalized text that matches a malicious reference identified by the reference information. As shown, the normalized text (here, "Lorem ipsum . . . ") does not match the malicious reference identified by the reference information (here, "www.badguy.com"). Assume further that, based on determining that the normalized text does not contain a malicious reference identified by the reference information, the detector indicates that a malicious reference has not been detected.

Figure 7F:
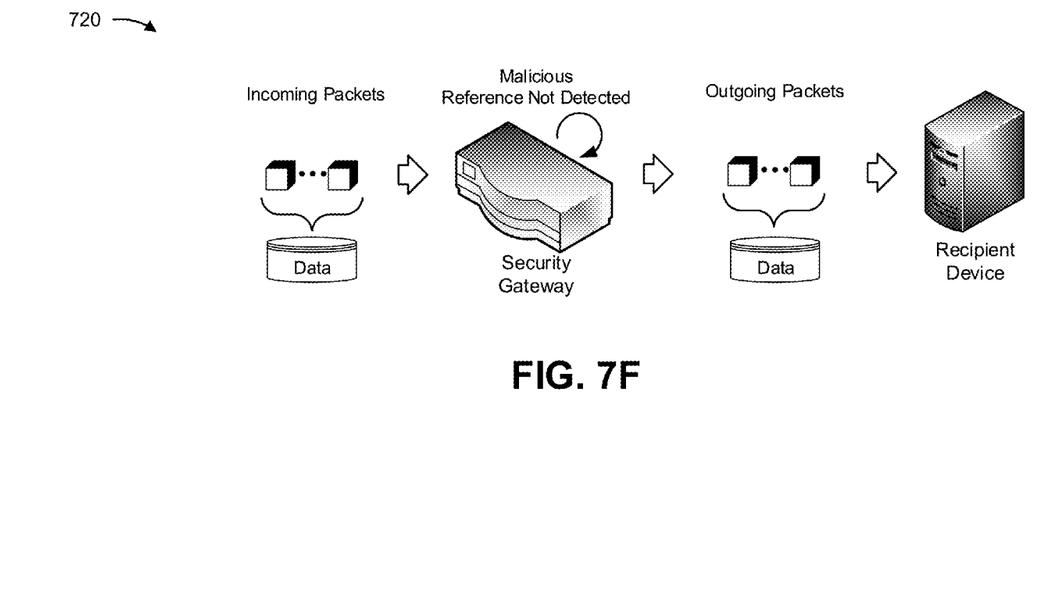

As shown in FIG. 7F, assume, for example implementation 720, that, based on not detecting a malicious reference in the normalized text, the security gateway forwards the packets to the recipient device. In this way, the security gateway may forward, to and/or from the recipient device, benign data which does not contain a reference to the command & control network.

As indicated above, FIGS. 7A-7F are provided merely as examples. Other examples are possible and may differ from what was described with regard to FIGS. 7A-7F.

Implementations described herein may assist a network operator in preventing an endpoint device from being compromised by harmful data by identifying and normalizing text from the data and selectively forwarding the data based on determining that the identified and normalized text does not contain a malicious reference.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The invention claimed is:

1. A device, comprising:
a memory; and
one or more processors communicably coupled to the memory to:
obtain pre-processing configuration information from a configuration server,
the pre-processing configuration information including network protocol information associated with a plurality of network protocols,
the plurality of network protocols including format information associated with a plurality of formats;
obtain reference information from the configuration server,
the reference information identifying one or more malicious references to be detected;
receive data as a set of packets from a first endpoint device;
identify a network protocol, of the plurality of network protocols, based on the network protocol information and information included in the data,
the network protocol being associated with receiving the data;
identify, based on obtaining the pre-processing configuration information and based on the format information and the information included in the data, a format associated with the data,
the plurality of formats including the format, and the format including at least one of:
an encoded file format,
a compressed file format, or
an encrypted file format;
process, based on the format and the network protocol, the data to generate normalized text,
processing the data including:
combining, based on a portion of the network protocol information, the set of packets into reassembled data, and
decoding, based on a portion of the format information corresponding to the format, the reassembled data into decoded text;
determine whether the normalized text includes the one or more malicious references,
the one or more malicious references identifying an address associated with a malicious device; and
prevent forwarding of the data to a second endpoint device based on determining that the normalized text includes the one or more malicious references.

2. The device of claim 1, where the one or more processors, are further to:
determine whether the data is encoded in a particular format; and
where the one or more processors, when processing the data to generate the normalized text are to:
process the data to generate the normalized text based on determining that the data is not encoded in the particular format,
the normalized text being encoded in the particular format, and
the normalized text including textual information included in the data.

3. The device of claim 1, where the one or more processors are further to:
drop the data based on determining that the normalized text includes the one or more malicious references.

4. The device of claim 1, where the one or more processors are further to:
determine whether the second endpoint device requested the data from the first endpoint device; and
selectively forward other data, received from the second endpoint device, based on determining that the normalized text includes the one or more malicious references and that the second endpoint device requested the data from the first endpoint device.

5. The device of claim 1, where the one or more processors, when receiving the data, are to:
receive the data based on determining that the one or more malicious references does not include an address associated with the first endpoint device.

6. The device of claim 1, where the one or more processors are further to:
identify a payload portion, of the data, based on the network protocol;
identify a textual content portion, of the payload portion, based on the format; and
identify, based on the payload portion and the format, an encoding format associated with the textual content portion; and
where the one or more processors, when processing the data, are to:
processing the data from the textual content portion by decoding the textual content portion based on the encoding format.

7. The device of claim 1, where the one or more processors, when obtaining the pre-processing configuration information, are to:
obtain the pre-processing configuration information incrementally as an update to existing pre-processing configuration information.

8. A non-transitory computer-readable medium storing instructions, the instructions comprising:
one or more instructions that, when executed by one or more processors, cause the one or more processors to:
receive, from a first device, a list of references,
the list of references identifying a set of devices,
the set of devices being associated with malicious network activity;
obtain pre-processing configuration information from the first device,
the pre-processing configuration information including network protocol information associated with a plurality of network protocols,
the plurality of network protocols including format information associated with a plurality of formats;
receive, from a second device, a set of packets,
the set of packets representing a file sent according to a network protocol of the plurality of network protocols,
the file being encoded according to a file format of the plurality of formats,
the file format including at least one of:
an encoded file format,
a compressed file format, or
an encrypted file format, and
the set of packets identifying a third device as a recipient for the file; identify a network profile from a plurality of network profiles,
the network profile corresponding to the network protocol,
the network protocol being based on the network protocol information and information included in the set of packets;

process, based on the pre-processing configuration information and the file format, the file to generate normalized text,
processing the file including:
combining, based on a portion of the network protocol information, the set of packets into reassembled data, and
decoding, based on a portion of the format information corresponding to the file format, the reassembled data into decoded text;
identify a text string from the normalized text based on the network profile and the pre-processing configuration information;
identify a format profile from a plurality of format profiles,
the format profile corresponding to the file format,
the file format being based on the format information and the information included in the set of packets;
determine, based on the format profile, whether the text string includes a reference from the list of references; and
selectively send or drop the set of packets based on determining whether the text string includes the reference,
the set of packets being sent to the third device based on determining that the text string does not include the reference, or
the set of packets being dropped based on determining that the text string includes the reference.

9. The non-transitory computer-readable medium of claim 8, where the one or more instructions, when executed by the one or more processors, further cause the one or more processors to:
determine, based on the list of references, that the set of devices does not include the second device; and
where the one or more instructions, that cause the one or more processors to receive the set of packets, cause the one or more processors to:
receive the set of packets based on determining that the set of devices does not include the second device.

10. The non-transitory computer-readable medium of claim 8, where the one or more instructions, when executed by the one or more processors, further cause the one or more processors to:
identify text from the text string based on information associated with the format profile; and
where the one or more instructions, that cause the one or more processors to determine whether the text string includes the reference, cause the one or more processors to:
determine whether the text string includes the reference based on identifying the text from the text string.

11. The non-transitory computer-readable medium of claim 8, where the one or more instructions, when executed by the one or more processors, further cause the one or more processors to:
receive another set of packets;
determine, based on the list of references, that the other set of packets is to be forwarded to a device of the set of devices; and
drop the other set of packets based on determining that the other set of packets is to be forwarded to the device.

12. The non-transitory computer-readable medium of claim 8, where the one or more instructions, when executed by the one or more processors, further cause the one or more processors to:
determine an encoding format associated with text from the file,
the encoding format being associated with the format profile;
where the one or more processors, that cause the one or more processors to process the file to generate the normalized text, cause the one or more processors to:
process the file by decoding the text, based on the encoding format, into a decoded text string,
the normalized text including the decoded text string;
where the one or more processors, that cause the one or more processors to identify the text string from the normalized text, cause the one or more processors to:
identify the decoded text string; and
where the one or more processors, that cause the one or more processors to determine whether the text string includes the reference, cause the one or more processors to:
determine whether the decoded text string includes the reference.

13. The non-transitory computer-readable medium of claim 12, where the one or more instructions, when executed by the one or more processors, further cause the one or more processors to:
identify the encoding format associated with the reference.

14. The non-transitory computer-readable medium of claim 8, where the one or more instructions, when executed by the one or more processors, further cause the one or more processors to:
send a notification, associated with dropping the set of packets, to the second device or to the third device.

15. A method, comprising:
obtaining, by a device, pre-processing configuration information from a configuration server,
the pre-processing configuration information including:
network protocol information associated with a plurality of network protocols, and
format information associated with a plurality of formats;
obtaining, by the device, reference information from the configuration server,
the reference information identifying one or more malicious references to be detected;
receiving, by the device, data as a set of packets from a sending device;
determining, by the device, based on obtaining the pre-processing configuration information, and based on the format information and information included in the data, a format associated with the data,
the plurality of formats including the format, and
the format including at least one of:
an encoded file format,
a compressed file format, or
an encrypted file format;
identifying, by the device and based on the format, text from the data;
processing, by the device, the text to generate normalized text, processing the text including:
- combining, based on a portion of the network protocol information, the set of packets into reassembled data, and
- decoding, based on a portion of the format information corresponding to the format, the reassembled data into decoded text;

determining, by the device, whether the normalized text identifies a malicious device included in a list of devices,
- the list of devices being identified by the reference information; and preventing, by the device, forwarding of the data to a receiving device based on determining that the normalized text identifies the malicious device in the list of devices.

16. The method of claim 15, further comprising:
determining whether the receiving device is identified in the list of devices; and
where receiving the data from the sending device comprises:
- receiving the data from the sending device based on determining that the receiving device is not identified in the list of devices.

17. The method of claim 15, further comprising:
decoding encoded text, to generate a decoded text, based on determining that the data includes the encoded text, the normalized text comprising the decoded text.

18. The method of claim 15, further comprising:
identifying a particular portion of the data; and
where processing the text comprises:
- processing the text based on identifying the particular portion of the data.

19. The method of claim 15, where determining whether the normalized text identifies the malicious device comprises:
- determining whether the normalized text includes a device identifier associated with the malicious device in the list of devices.

20. The method of claim 15, further comprising:
generating filtered data based on determining that the normalized text identifies the malicious device,
- the filtered data including at least a portion of the data, and
- the filtered data not including a particular portion of the data,
  - the particular portion corresponding to a particular portion of the normalized text which identifies the malicious device; and forwarding the filtered data to the receiving device based on determining that the normalized text identifies the malicious device.

* * * * *